United States Patent [19]
Overbay

[11] Patent Number: 4,856,354
[45] Date of Patent: Aug. 15, 1989

[54] INSPECTION PROBE MANIPULATOR

[75] Inventor: Mark A. Overbay, East Ridge, Tenn.

[73] Assignee: Combustion Engineering, Inc., Windsor, Conn.

[21] Appl. No.: 164,595

[22] Filed: Mar. 7, 1988

[51] Int. Cl.[4] .......................................... G01M 19/00
[52] U.S. Cl. ..................... 73/866.5; 376/249
[58] Field of Search ............ 73/866.5; 358/98; 376/245, 249

[56] References Cited

U.S. PATENT DOCUMENTS

| | | | |
|---|---|---|---|
| 3,025,464 | 3/1962 | Bond | 73/866.5 X |
| 3,845,463 | 10/1974 | Timbs | 73/623 X |
| 3,862,578 | 1/1975 | Schlüter | 73/866.5 |
| 4,118,139 | 10/1978 | Lemelson | 408/12 |
| 4,177,676 | 12/1979 | Welker | 73/866.5 X |
| 4,481,814 | 11/1984 | Wentzell | 73/866.5 |
| 4,586,079 | 4/1986 | Cooper, Jr. et al. | 358/98 X |
| 4,624,400 | 11/1986 | Zimmer | 226/154 X |
| 4,633,713 | 1/1987 | Mesdord et al. | 73/866.5 |
| 4,753,248 | 6/1988 | Engler et al. | 128/736 |
| 4,770,053 | 9/1988 | Broderick et al. | 376/245 X |

Primary Examiner—Tom Noland
Attorney, Agent, or Firm—John H. Mulholland

[57] ABSTRACT

A manipulator for a fiberscope probe or other inspection probe includes a fixed base 20 and a chassis 96 rotating on a hollow spindle 70 relative to the base. The chassis, spindle and an internal housing 66 rotate together with a translative motor 60 for powering a friction drive and the rotation providing motor 100. The friction drive wheels 26 and 28 oppose idlers 30 and 32 which are movable by means of a tensioner 74 to increase the friction of the drive mechanism. The friction drive wheels extend into a central passage 12 through which the probe passes to drive the probe. The rotation motor acts with a gear fixed relative to base 20 and is controlled through limit switches 122 and 124 for 400° of rotation. A potentiometer 130 monitors rotational positions. An encoder 140, driven by an idler to eliminate slippage, monitors the friction drive of the probe.

8 Claims, 6 Drawing Sheets

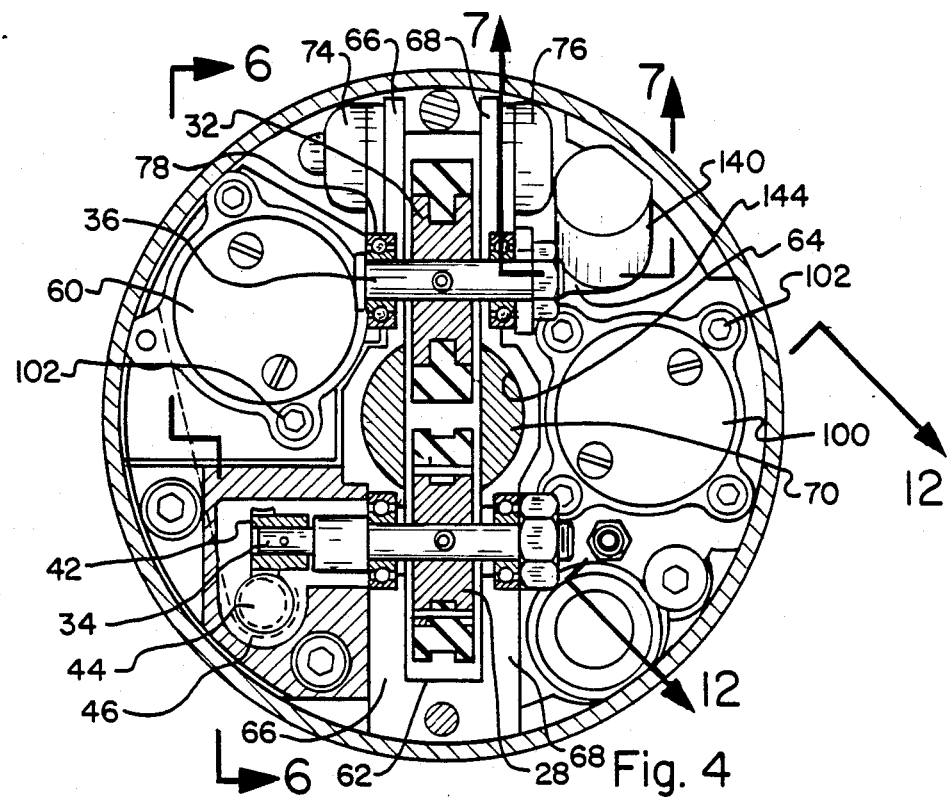
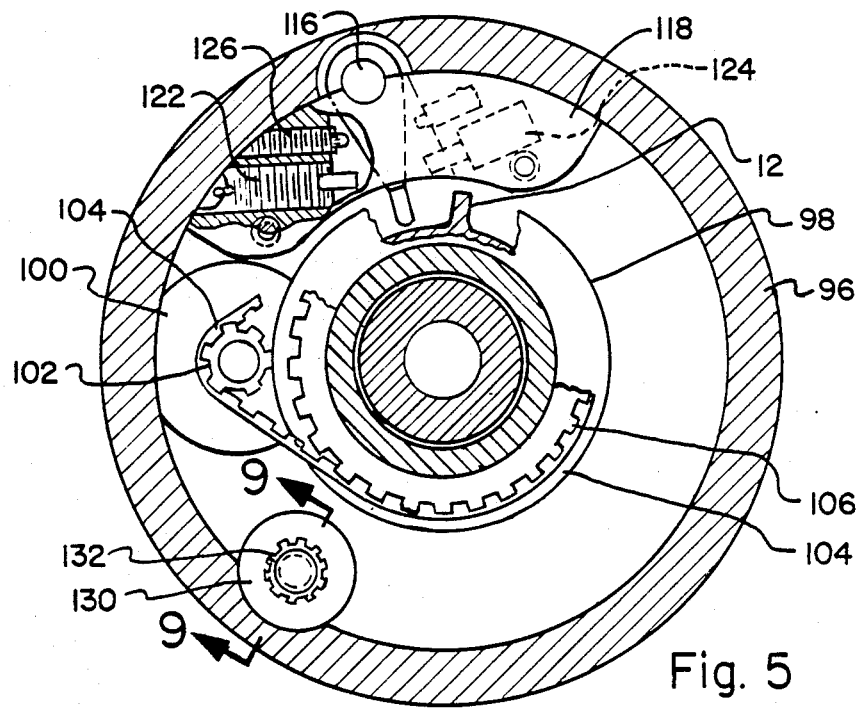

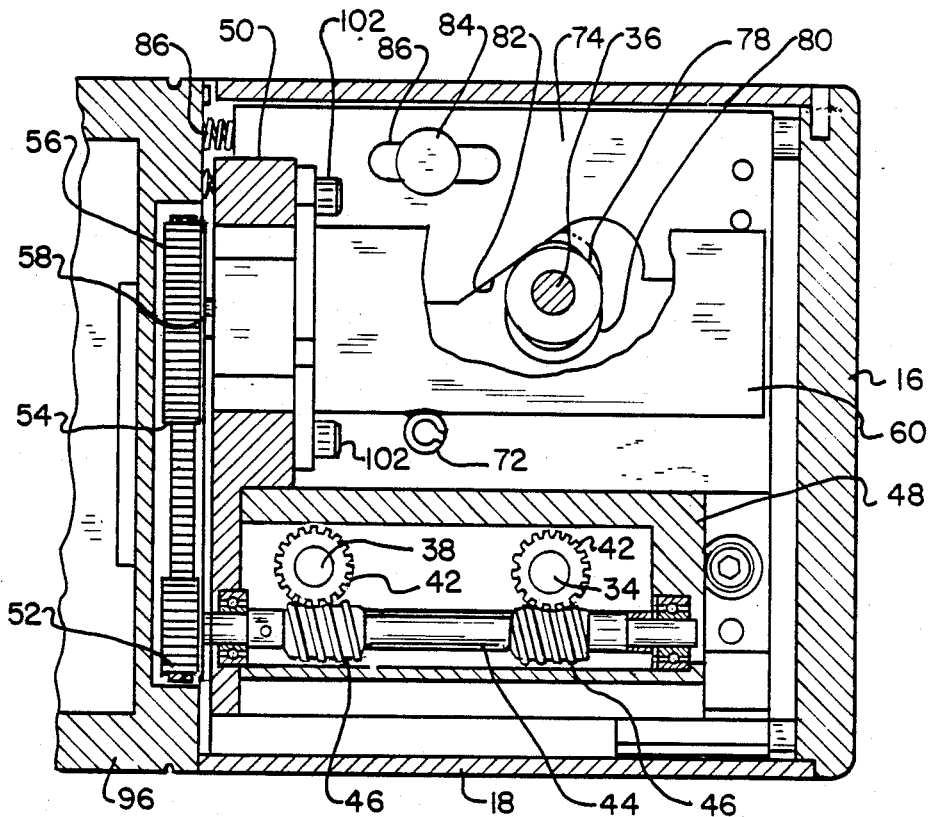
Fig. 6
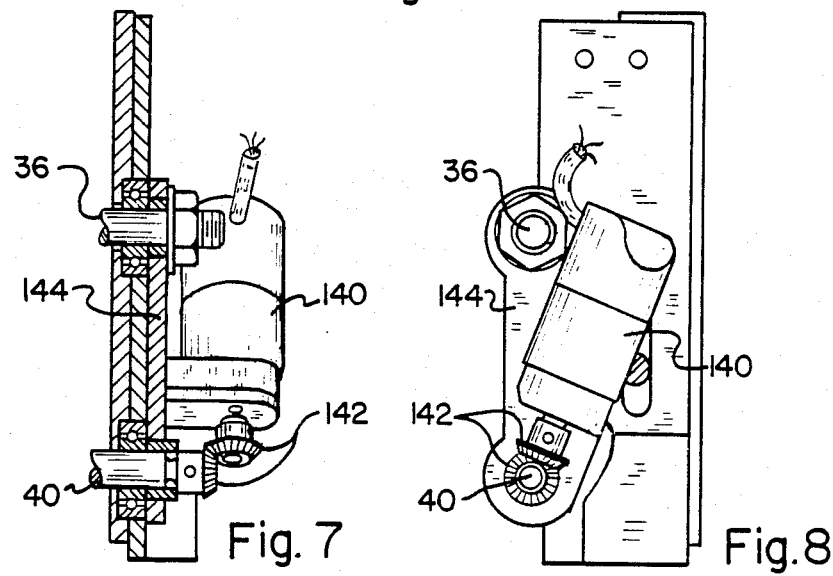
Fig. 7
Fig. 8

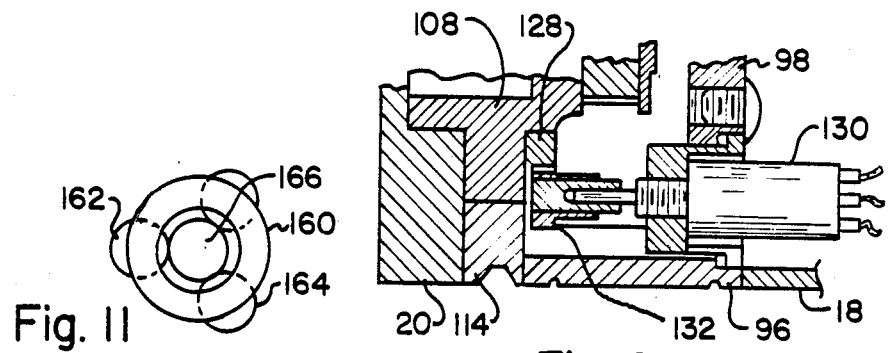
Fig. 11
Fig. 9
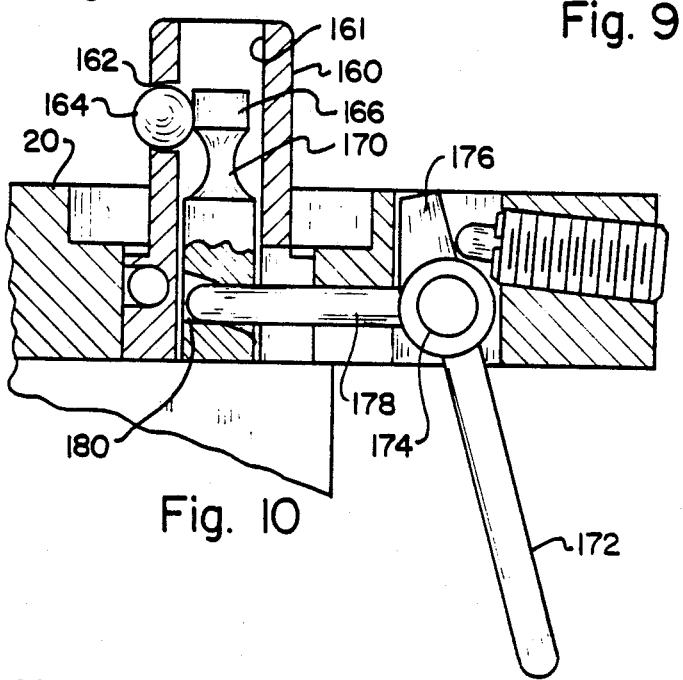
Fig. 10
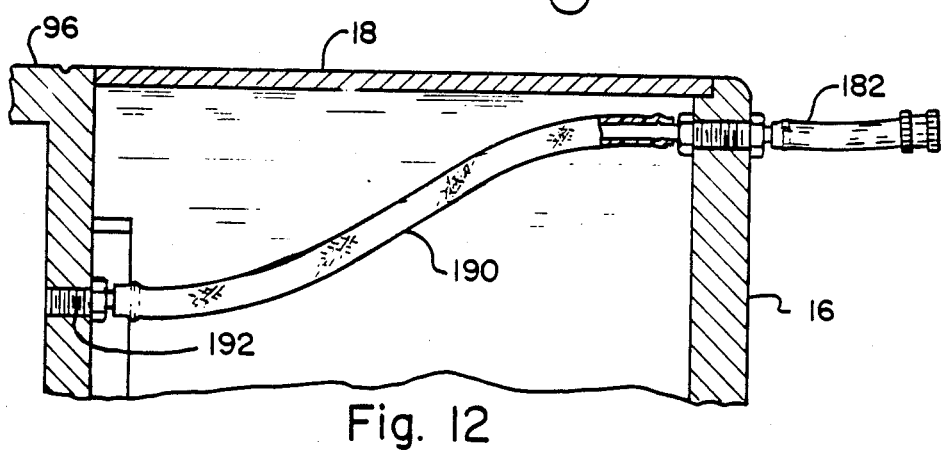
Fig. 12

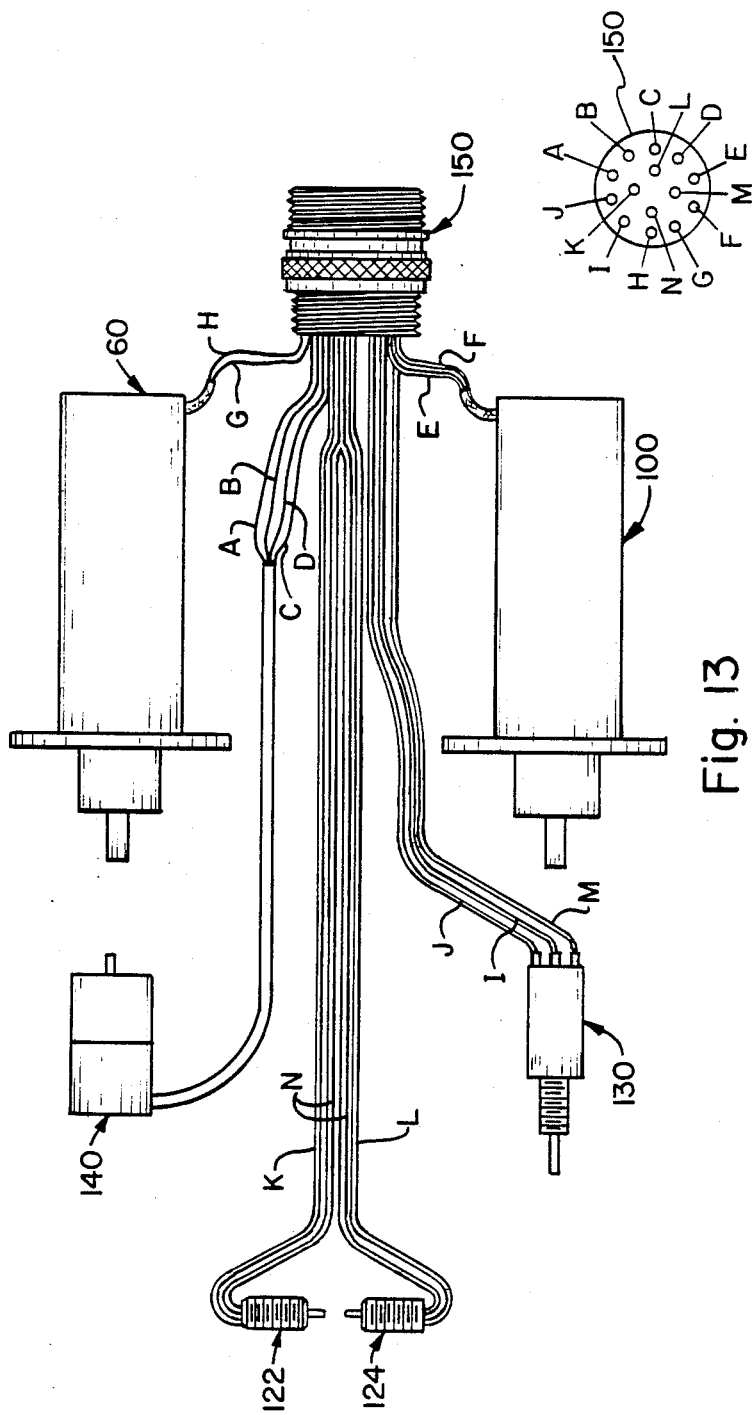

INSPECTION PROBE MANIPULATOR

FIELD OF THE INVENTION

The present invention relates to an apparatus for the inspection of heat exchanger tubes and tubesheet environment and, in particular, the tubes of a nuclear steam generator after they have been in service in the production of electricity.

BACKGROUND OF THE INVENTION

It has previously been attempted to manually withdraw and rotate a signal-producing-sensor probe or fiberscope through a zone of a tube which is desired to be inspected and to visually note the probe of fiberscope position while recording the signal or view from such inspection for analysis. An automatic indexer assembly as disclosed in U.S. patent application Ser. No. 916,349, now U.S. Pat. No. 4,770,053 but filed Oct. 7, 1986 by Michael Luedke, and assigned to the same assignee as the instant application, provided a means remote from the tubesheet and tube opening to eliminate or diminish intermittent variables which may distort the signal to be recorded. Motion and control came through a long probe tail torsionally driven by telescopically assembled shafts, to which it was clamped. The indexer includes a slip ring and a fluid swivel.

In the case where it has been desirable to perform fiberoptic inspection of tubes, tube support plates and sludge, typically, during used tube removal, the current practice is inefficient and inconvenient. It includes having an individual position and hold the fiberscope within the radiation contaminated steam generator.

Positioning and manipulation of the fiberscope is directed by an individual at a monitor in an uncontaminated area. The director is in head set communication with the individual in the steam generator head. The fiberscope is focused by an individual in a containment tent.

Tube bow or dent measurements are performed by the insertion of a backlight and/or target from the opposite tube end. The target is viewed with a forward facing fiberscope and the tube bow is measured by the displacement of the target centerline from the fiberscope centerline. Bow measurement requires coordinated operation between the fiberscope and backlight and the maintenance of relative distances within the tube.

Accordingly, there is a need in the art for a remote controlled manipulator capable of inserting or retracting a fiberscope, backlight or other tube visual inspection device along the length of a tube. The manipulator should be capable of rotating the device 360° at any location along the length of the tube.

The manipulator should be capable of positioning fiberscopes such as an Olympus Fiberscope (IF-8D3-30) (8 mm), an Olympus Fiberscope (IF-6D2-30) (6 mm), a Welch-Allyn Video Probe ($\frac{1}{4}$ inch), or a backlight.

The manipulator must position several sizes (OD) of visual inspection devices. Also with advances in inspection probes, probes of other sizes may be positioned in the future. This requires drive means which are independent of a particular probe size.

In addition, it is clear there is a need in the art for a more compact, easier to handle and still accurate means of manipulation of a probe, including a fiberscope, by motors and drive means on a base fixedly mounted adjacent the lower side of a steam generator tube sheet instead of manually or by motors outside of the steam generator, as in the case of the previously described automatic indexer assembly.

SUMMARY OF THE INVENTION

The present invention provides an improved manipulator for providing measured amounts of rotational movement and translative advancing and retracting movement to an inspection probe located within an opening. The inspection probe manipulator provides a remote, compact, easy to handle accurate means to manipulate a probe. It is especially useful as a fiberscope manipulator in the inspection of steam generator tubes, tube sheets and sludge on the upper surface of a tube sheet.

The probe maniupulator has a cylindrical configuration. It has means for securing it to the tubesheet. Rotation is accomplished by a permanent magnet D.C. motor with a life in excess of one-thousand hours continuous duty and a 3 mm pitch nylon covered fiberglass reinforced neoprene, 9 mm wide, timing belt. This results in a strong, smooth, and very reliable drive train which requires minimal maintenance. Measured rotation is approximately 400° to preclude the possibility of a blind spot during inspection. In order to prevent rotation in excess of 400°, a limit switch activator which is also capable of stalling the drive motor, has been incorporated in the design. Measured rotation monitoring is accomplished with a precision gear driven ten turn potentiometer which generates a linear analog voltage signal. This potentiometer is geared such that 400° of rotation causes the potentiometer to turn approximately nine turns which yields very good resolution without risking damage to the potentiometer due to exceeding the internal stop at either extreme. The manipulator rotates on a double row permanently lubricated sealed ball bearing.

Measured translation is accomplished using a permanent magnet D.C. motor, with a life in excess of one-thousand hours continuous duty, supplying power through a 3 mm pitch nylon covered fiberglass reinforced neoprene, 9 mm wide, timing belt and a tandem pair of worms and shafts into two polyurethane drive wheels. This arrangement utilizing worm gears locks the drive wheels when there is no electric power to the motor. Tension is applied to the probe with two polyurethane idler wheels opposite the two drive wheels. The idler wheels are capable of supplying up to sixty pounds of force per wheel to the probe to prevent slippage of the frictional drive system. This is accomplished with a tensioning system using coil springs.

Translation is variable and controlled from zero feet per minute to approximately thirteen feet per minute maximum. Translation is monitored with a miniature optical shaft encoder driven by one of the idlers to preclude the possibility of false information caused by the friction drive wheel slippage.

The control panel used incorporates two digital meters to indicate rotation in degrees and tenths of degrees and translation in inches and tenths of inches. The rotation and translation motors will be actuated by a momentary rocker switch to obtain clockwise and counterclockwise rotation and potentiometers to provide motor speed control. The rotation function may also be monitored by indicator lamps to show the ends of travel. Both motors have current limiting circuitry to prevent motor damage.

BRIEF DESCRIPTION OF THE DRAWINGS

FIG. 4 is a cross-sectional view taken along the line 4—4 of FIG. 1;

FIG. 5 is a cross-sectional view taken along the line 5—5 of FIG. 1;

FIG. 6 is a fragmentary cross-sectional view taken along the line 6—6 of FIG. 4;

FIG. 7 is a cross-sectional view taken along the line 7—7 of FIG. 4;

FIG. 8 is a view taken at a right angle to FIG. 7;

FIG. 9 is a fragmentary cross-sectional view taken along the line 9—9 of FIG. 5;

FIG. 10 is a fragmentary cross-sectional view taken along the line 10—10 of FIG. 2;

FIG. 11 is a fragmentary end view of a portion of FIG. 10;

FIG. 12 is a schematic view generally taken in the direction shown by the line 12—12 in FIG. 4;

FIG. 13 is a schematic view of the wiring harness of the manipulator of FIG. 1 for interconnection with a control panel; and FIG. 14 is a schematic end view of the connector of FIG. 13.

DETAILED DESCRIPTION OF THE PREFERRED EMBODIMENT

Figure 1:
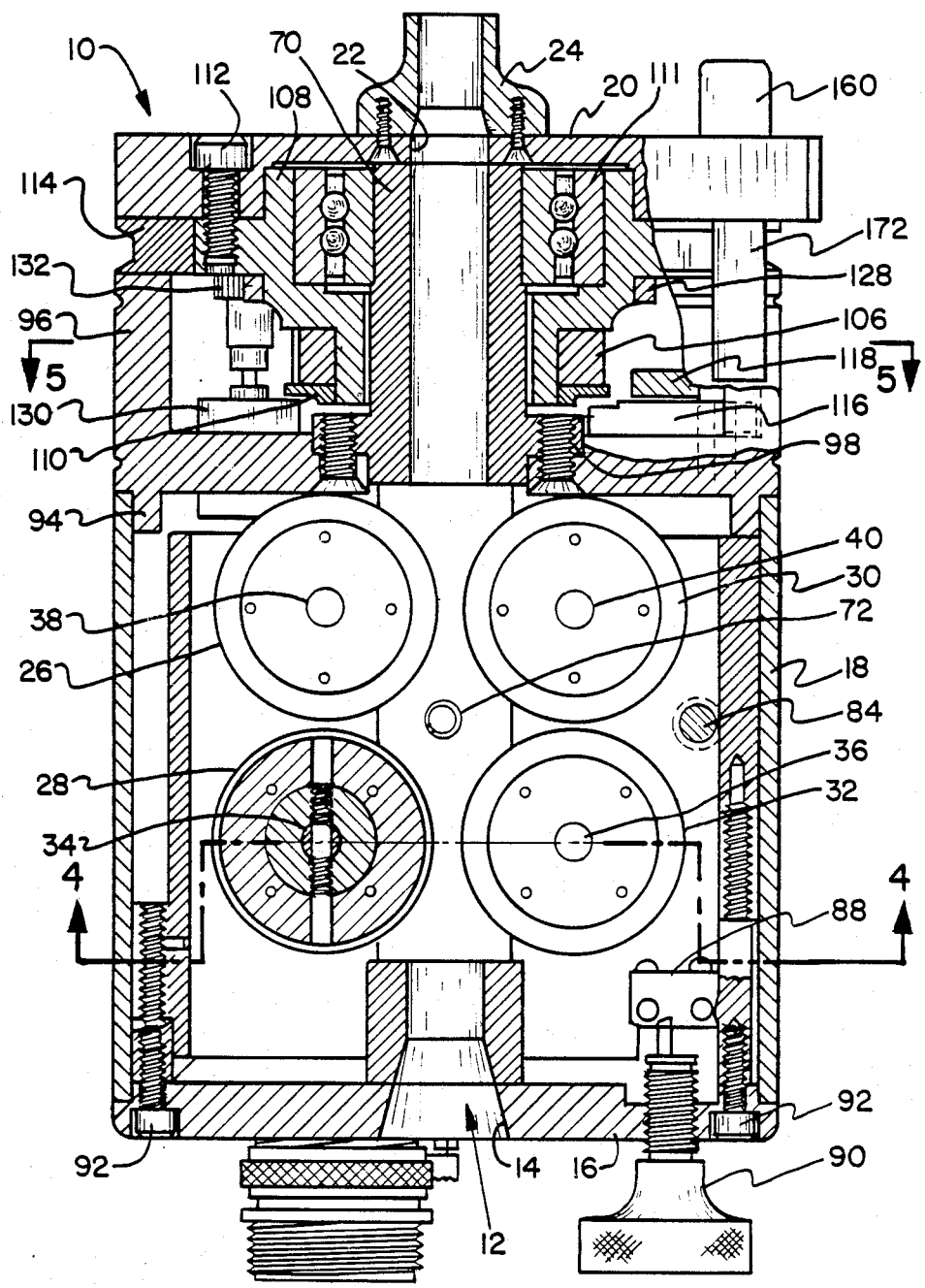
FIG. 1 is a cross-sectional elevational view of an improved inspection probe manipulator constructed in accordance with the principals of the invention.
Figure 2:
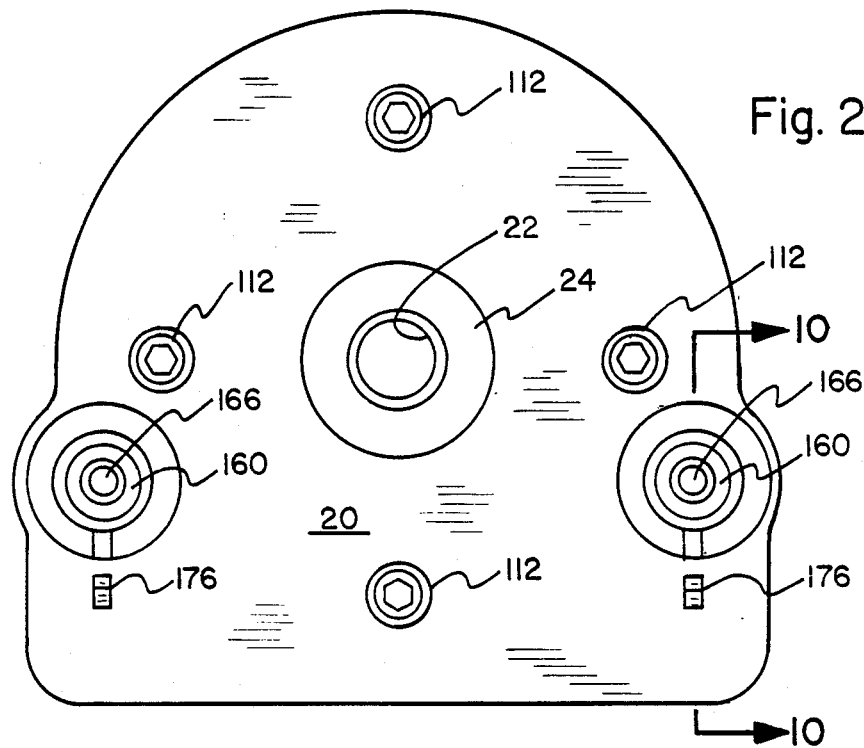
FIG. 2 is a top end view of the manipulator of FIG. 1.
Figure 3:
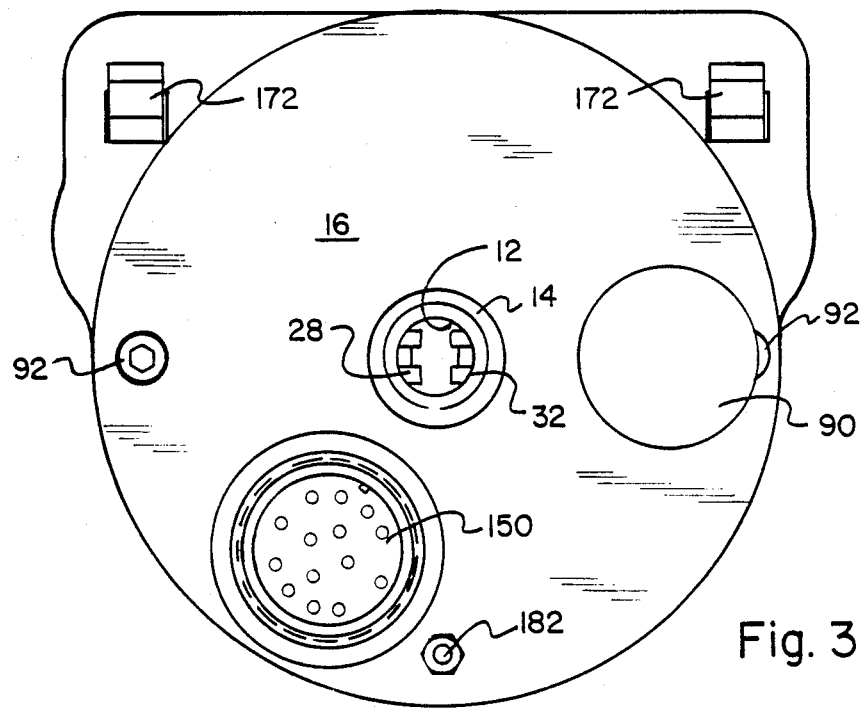
FIG. 3 is a bottom end view of the manipulator of FIG. 1.

Like elements are assigned like numbers in the various views of the drawings.

The improved manipulator of the invention for providing measured amounts of rotational movement and translative advancing and retracting movement to an inspection probe located within an opening is designated by the numeral 10. The manipulator has a central passageway designated 12 through which an elongated probe, such as fiberscope, passes.

The lower end of the passageway 12 is defined by a tapered opening 14 in an end cover 16 of a cylindrical body or shell member 18. A base or upper end cover 20 has a central opening 22 around which is a hollow probe guide 24 which defines the upper end of passageway 12.

Means for providing frictionally driven measured translative advancing and retracting movement to a probe located in passageway 12 is provided by means of driven wheels 26 and 28 with respectively opposing idler wheels 30 and 32. The wheels 28 and 32 are mounted respectively on drive shaft 34 and idler shaft 36 and the wheels 26 and 30 are mounted respectively on drive shaft 38 and idler shaft 40.

Suitable ball bearings support the shafts 34 to 40 and the wheels 26 to 32 are each suitably pinned to its respective shaft end. The drive shafts 34 and 38 have worm gears 42 mounted on their ends in driven relation to a transfer shaft 44 which has two worm gears 46, respectively, fixed thereon and in driving relation with the two worm gears 42. Transfer shaft 44 is suitably mounted with bearings in a gear case 48 and transfer plate 50. A driving pulley 52 attached to the end of shaft 44 is driven by means of a belt 54, which is in turn driven by pulley 56 on the end of a shaft 58 of a translation motor 60. The motor 60 is known to those in the art as a T.R.W./Globe No. #5A2340-21.

The ball bearings supporting the ends of shafts 34 to 40 are mounted in the side walls of an interior housing 62 having a central passageway 64. The housing 62 has a left-hand wall 66 and a right-hand wall 68 in which a bearing for each respective end of the shafts are mounted such that the wheels all extend into the passageway 64 and through opposing slots in a central spindle member 70 fixed to housing 62 in passageway 64, by means of spring pin 72, for rotation therewith.

Mounted on the left-hand wall 66 and the right-hand wall 68, respectively, are left-hand trensioner 74 and right-hand tensioner 76. The idler shaft bearings 78 can move toward the opposing fixed drive shaft bearing along slots 80 in the right- and left-hand walls 66 and 68, as shown in FIG. 6. This movement can increase the friction drive force applied to a probe squeezed between the wheels in passageway 12.

The tensioners 74 and 76 have a cam surface 82 acting on bearings 78 to force the idler shafts inward. This occurs when the left- and right-hand tensioners 74 and 76 move on pin 84 in slot 86 in an axial direction. The pin 84 is fixed in housing 62 and thus there is relative axial movement between housing 62 and the tensioners 74 and 76 as they move against spring 86. The axial motion is transmitted to tensioners 74 and 76 through a tensioner link and pin arrangement 88 and a manually advanced threaded spring compressor 90 mounted for threaded engagement through end cover 16.

Bolts 92 attach end cover 16 to housing 62 and hold shell 18 in place on a ledge outside of flange 94 of a chassis member 96 bolted to flange 98 of spindle 70. A rotational movement providing motor 100, which is similar to motor 60, is bolted to chassis member 96 by bolts 102. Motor 60 is also mounted in this manner to the chassis member 96.

The spindle 70 and the chassis member 96 are driven by the motor 100 through a pinion 102 and belt 104. A pulley 106 fixed to a hub 108 behind a flange 110 creates the rotational motion because the hub 108 is non-rotatably fixed to the base or upper end cover 20 by means of bolts 112. The spindle 70 rotates within ball bearings 111 mounted in the hub 108. A plastic ring 114 of Delrin fills the gap and may act as an anti-friction surface between the rotating chassis member 96 and the fixed hub 108.

Rotation is controlled over something slightly in excess of 360°, typically 400°, to preclude the possibility of a blind spot during inspection. In order to prevent rotation in excess of, say, 400°, a limit switch actuator 116 is provided in a switch housing 118 fixed to the chassis member 96. The end of actuator 116 extends into the rotational path of a lug 120 which rotates with flange 98 and therefore moves actuator 116 into contact with limit switches 122 and 124. The switches 122 and 124 are of the type known as Grayhill No. 39-101. Spring plungers 126, such as Carr Lane No. CL-31-SPS-1, limit travel of actuator 116.

A potentiometer drive gear 128 fixed to the fixed hub 108 creates relative drive rotation of the shaft of the potentiometer 130 through a gear 132 as the spindle 70 turns the chassis member 96, on which potentioneter 130 is mounted, in response to motor 60. A rotational position indicating signal is created in the potentiometer 130. Typical of potentiometers for this purpose is Spectrol No. 12F2905 which is a ten turn potentiometer sold by Newark Electronics. It is set up for nine turns to insure good resolution without damage.

The translation motor 60 is capable of varying speed from zero feet per minute to approximately thirteen feet per minute maximum. Translation is monitored with a miniature optical shaft encoder 140 driven by one of the idlers, idler 30, through shaft 40 and bevel gears 142. A Delrin bracket 144 holds the encoder 140 against right-hand wall 68 on the end of shafts 36 and 40. A suitable encoder is Micro-Mo No. 018-H-100Z.

The wiring harness for the translation motor 60, rotation motor 100, limit switches 122 and 124, potentiometer 130 and encoder 140 is shown terminating in a connector 150 for connection to a control panel to perform the functions as described above.

For use of the manipulator 10 in inspecting heat exchanger tubes and tubesheet environments by means such as a fiberscope, the base 20 is fixed by means of ball locks 160 projecting from the plane of the base. The locks 160 have bores 161, symmetrical openings 162 and balls 164 captured therein by means of an axially movable mandrel 166 with a ball accommodating annular camming groove 170. Axial motion is imparted to mandrel 166 to effect the lock by means of handle 172 pivoting on pin 174. A dog 176 attached to handle 172 gives the ball lock a bias by means of a Carr Lane No. Cl-43-SSPS-1 spring plunger. The Carr Lane Company is in St. Louis, Mo. Hnadle 172 moves mandrel 166 through lever 178 acting in opening 180, thereof.

In order to prevent or remove fogging on a fiberscope, in the event that is the type of inspection probe being manipulated, a nitrogen gas supply is provided on the manipulator through fitting 182 in end cover 16. A suitable hose 190 to a fitting 192 through the chassis member 96 may be provided in order to supply gas along the spindle 70, through the bearings 111 and guide 24, into the tube lined up with passage 12 and containing the fiberscope.

Other additional features can be provided as part of the inspection probe manipulator but it will be seen that the presently disclosed embodiment provides a compact, easy to handle, accurate means of maniuplating a probe with measured translative and measured rotational motion.

I claim:

1. An improved manipulator for providing measured amounts of rotatonal movement and translative advancing and retracting movement to an inspection probe located within an opening, said manipulator comprising:

means for providing frictionally driven measured translative advancing and retracting movement to said probe;
   means for providing measured rotational movement both to said probe and to said means for providing frictionally driven measured translative advancing and retracting movement to said probe; and
   a base including means for fixing said base relative to said opening within which said inspection probe is located, said base supporting for relative rotation thereto both said means for providing frictionally driven measured translative advancing and retracting movement to said probe and said means for providing measured rotational movement to said probe and to said means for providing frictionally driven measured translative advancing and retracting movement to said probe.

2. The improved manipulator of claim 1 in which said means for providing frictionally driven translative advancing and retractive movement to said probe and said means for providing measured rotational movement to said probe and to said means for providing frictionally driven measured translative advancing and retracting movement to said probe are remotely and independently controlled.

3. The improved manipulator of claim 1 in which said means for providing frictionally driven measured translative advancing and retracting movement to said probe includes opposing wheels and means for adjusting the distance between said wheels.

4. The improved manipulator of claim 1 in which said means for providing frictionally driven measured translative advancing and retracting movement to said probe includes
   opposing driven and idling wheels, and
   means for producing a signal dependent on the rotation of an idling wheel which is opposed to a drive wheel.

5. The improved manipulator of claim 1 in which said means for providing rotational movement includes a potentiometer geared to sense relative rotational position between the base and the means supported by said base for rotation relative thereto.

6. The improved manipulator of claim 1 in which the base supports the means for rotation relative thereto by means of a spindle mounted for rotation in bearings on the base.

7. The improved manipulator of claim 1 in which the base includes means to lock the base in a fixed position relative to an opening to be inspected.

8. The improved manipulator of claim 1 in which mean for supplying gas adjacent the probe to be manipulated is provided.

* * * * *